Oct. 19, 1943.  W. S. SOUTHWICK  2,332,022
WELDING DEVICE
Filed June 23, 1942
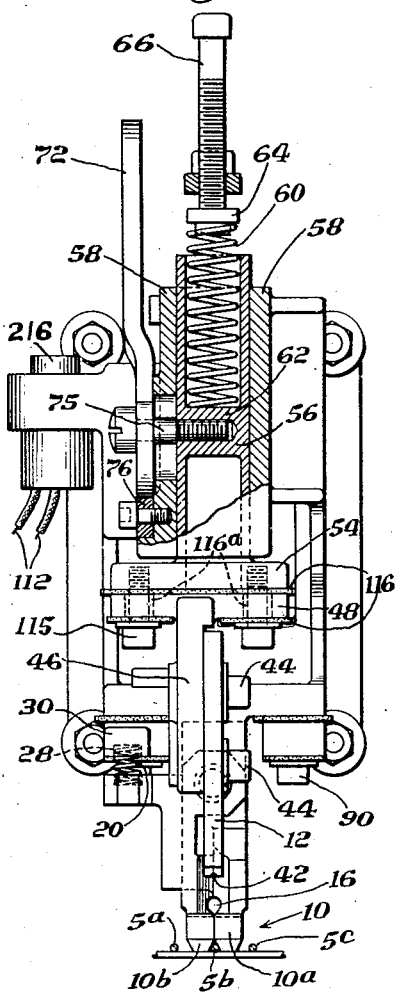
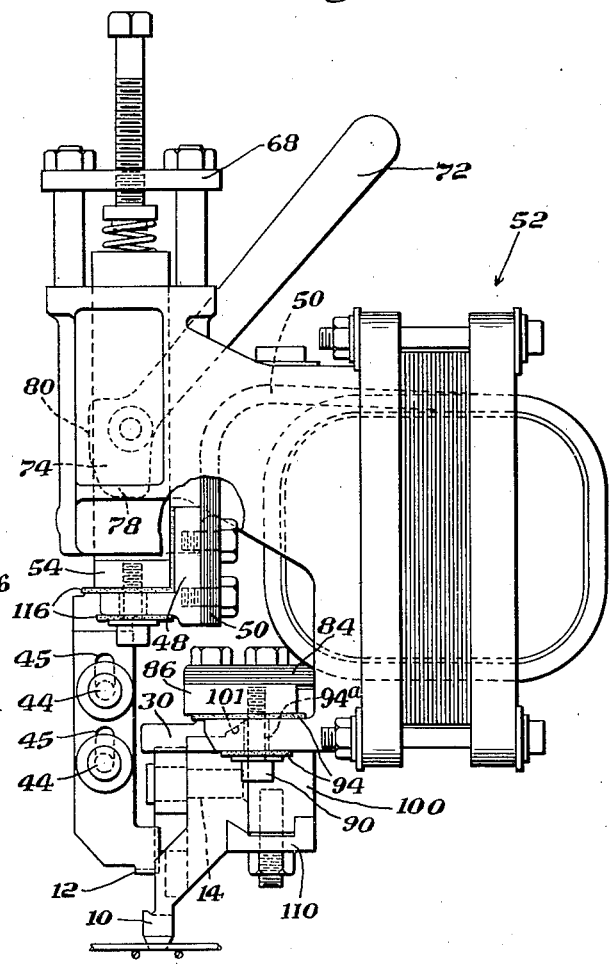
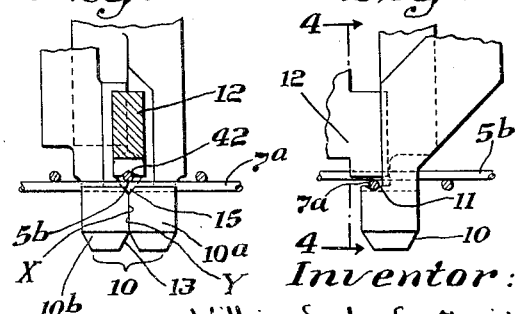
Inventor:
William Sayles Southwick
by Richard W. Whitelaw
Attorney Patented Oct. 19, 1943

2,332,022

UNITED STATES PATENT OFFICE 2,332,022

WELDING DEVICE

William Sayles Southwick, East Lynn, Mass., assignor to Thomson-Gibb Electric Welding Company, Lynn, Mass., a corporation of Massachusetts Application June 26, 1942, Serial No. 448,548

5 Claims. (Cl. 219—4)

This invention relates to electric welding devices and particularly to a device for welding together two crossing wires of a preformed wire fabric.

After a wire fabric has been manufactured it is frequently necessary to weld together an occasional longitudinal ("strand") wire and a transverse ("stay") wire at their mutual point of crossing, as, for example, where the machine which made the fabric skipped a crossing which it was supposed to weld, leaving it unwelded. Such an unwelded crossing constitutes an imperfection and is desirably welded in an ensuing operation called "skip welding." Skip welding involves positioning the unwelded wires at their crossing between a pair of electrodes at opposite sides of the fabric, pressing the wires together between the electrodes and passing a welding current from one electrode through the crossed wires at the crossing to the other electrode for a sufficient interval to effect the weld.

An object of this invention is to provide a novel welding device, suitable for skip welding a preformed fabric, in which one of the electrodes of the pair is adapted to be extended through a preformed fabric, even of small mesh. For that purpose, the preferred embodiment of my device has a lower electrode constructed of a pair of separable parts which split upon one of the two wires forming the crossing, to pass through seperate meshes of the fabric on opposite sides of the wire and come together on the far side of the fabric. This novel electrode construction enables use of the device for welding crossings of a fabric having a mesh too small to be penetrated by the conventioned electrode and yet affords continuous support for the lower wire of the pair, beneath and on both sides of the crossing.

By this construction the lower electrode, composed of two parts, has a total cross section which may be greater than the mesh of the fabric which it penetrates so that its current carrying capacity is very much larger than the conventional electrode.

In the drawing:

Fig. 1 is a front elevation view of my device partly in section;

Fig. 2 is a side elevation view thereof;

Fig. 3 is a perspective view of the lower electrode;

Fig. 4 is a vertical section on the line 4—4 of Fig. 5; and

Fig. 5 is a side elevation view of the electrodes in welding position.

A typical preformed wire fabric (Fig. 3) on which my novel device is adapted to perform skip welding operations is composed of strand wires, of which three are shown at 5a, 5b and 5c, and stay wires, of which two are shown at 7a and 7b. In such a fabric my device will weld, for example, the strand wire 5b to the stay wire 7a which it is assumed were not welded together, as they should have been, when the fabric was made. The spacing between the center lines of adjacent strand wires or adjacent stay wires may be as small as one-half inch, thus presenting meshes, as indicated at 9a and 9b, of an area restricted to somewhat less than one-half inch square.

The device illustrated (Figs. 4 and 5) has a lower electrode, shown generally at 10, adapted to be inserted through the fabric to support, on the grooved shoulder 11, the stay wire 7a to be welded, and an upper electrode 12 adapted to be lowered and pressed down on the strand wire 5b where it crosses the stay wire 7a to effect the weld at the crossing.

The lower electrode 10 is formed of two jaw-like parts 10a and 10b (Fig. 3) which are movable relative to each other and have opposed abutting faces X and Y. The part 10a, integral with block 102, is fixed and part 10b is pivotally mounted on stud shaft 14, carried by block 102, and spring pressed toward part 10a by a spring 20 (Fig. 1) seated in a recess 28 formed in a lug 30 projecting from the frame of the device and in a lower recess 22 formed in an arm 24 projecting laterally from the part 10b. To extend the lower electrode 10 through the fabric, the electrode is rested on the fabric, which is supported from beneath, with strand wire 5b received in the notch 13 (Fig. 4) formed between parts 10a and 10b of the electrode. The device is then pressed against the fabric so that strand wire 5b is forced between parts 10a and 10b to spread them apart and the device is moved downwardly until grooved shoulder 11 is lower than the stay wire 7a which it is to support, when strand wire 5b is received within complementary recesses 16 in parts 10a and 10b, allowing the parts to close together on the opposite side of the fabric. The device is then moved forwardly and upwardly to place the stay wire 7a in the groove of the shoulder 11.

The upper electrode 12 slides vertically in a V-shaped recess 40 (Fig. 3) formed in the front faces of the parts 10a, 10b and the electrode 12 is V-shaped conformingly. Its lower wire-engaging end is notched at 42 (Fig. 4) to insure good electrical contact with the strand wire 5b.

Electrode 12 (Fig. 1) is secured to a plate 46 by bolts 44 passing through elongated slots 45 (Fig. 2) in the electrode and screw threaded into the plate. The plate is integral with piece 48 which is L-shaped, as seen in Fig. 2, and to the back of which is bolted the end of a low resistance flexible conductor 50 leading from the secondary of a step-down transformer, designated generally at 52. To reciprocate the upper electrode 12 vertically the angle piece 48 is bolted at 115 to the base 54 of a slide 56. The slide is electrically insulated from the piece 48 by insulation 116 interposed between them and by insulated bushings 116a surrounding bolts 115. Slide 56 is received in a slideway 58 and is urged downwardly by compression spring 60 extending between a web 62 formed in the slide and a seat 64 carried by the end of a bolt 66 screw threaded through a cap 68 fixed to the frame. By turning bolt 66 the pressure with which spring 60 urges electrode 12 against the wire can be adjusted in an apparent manner.

The electrode 12 is held in raised position by means of a manually operable lever 72 mounted on stud 75 screw threaded into the web 62 and having a cam 74 which abuts a hardened metal insert 76 secured to the frame and therefore fixed in position. The cam 74 has a lobe 78 and a low portion 80. When lever 72 is in the position shown in Fig. 2 with the lobe 78 abutting plate 76 the electrode is held in elevated position. As the handle is swung counterclockwise spring 60 moves electrode 12 toward the fabric, which movement continues until the notched end 42 of the electrode abuts wire 5b. To insure that the electrode is pressed against the wire with the full force of spring 60 the portion 80 of the cam is low enough to avoid touching plate 76 in welding.

The secondary of the transformer is also connected to the lower electrode by another low resistance conductor 84 bolted to a plate 86 which is in turn bolted to the frame of the machine by bolts 90. The plate 86 is insulated from the frame by insulation 94 and by insulated bushings 94a surrounding the bolts 90. Plate 86 extends downwardly to form a block 100, which has an indenture 101, with which the portion 102a of block 102 carrying the lower electrode 10 is adapted to dovetail. The portion 102b of block 102 dovetails with a securing plate 110 bolted onto the block 100.

In this manner the block 102 is securely mounted and electrically connected to the conductor 84 by connections insulated from the frame of the machine.

The primary of the transformer 52 is supplied with current from a source, not shown, by leads 112 passing through a timer of conventional type for automatically timing the flow of welding current. A push button 216 closes the primary circuit and starts the flow of the current.

When using the device, it is preferably suspended from an overhead carrier which takes the weight of the device but allows it to be moved vertically and horizontally. The fabric is supported in a generally horizontal position. When a skip weld is to be made the lower electrode is inserted through the fabric in the manner above described and after the stay wire 7a has been placed on the grooved shoulder 11 forming the electrically contacting surface of the lower electrode, the upper electrode 12 is pressed on the crossing strand wire 5b by the operator rotating lever 72 to its counterclockwise position, as above described. The push button 216 is then depressed and the weld made. Thereafter the upper electrode 12 is elevated and the lower electrode withdrawn from the fabric by first moving the device to remove wire 7a from grooved shoulder 11 and then lifting the device to force the wire 5b into notch 15 (Fig. 4) to separate the parts 10a and 10b as the device is lifted.

I claim:

1. In a device for welding, at their crossing, a strand and a stay wire of a preformed metal fabric, the combination of an electrode formed of separable parts adapted to be moved apart to receive one wire of the pair between them to extend the electrode through the fabric, a recess between said parts in which said wire is received to permit closure together of the parts extended through the fabric, a shoulder on said electrode to support the other wire of said pair at said crossing, and a complementary electrode adapted to be moved into contact with the first wire of the pair at said crossing to form a closed electrically conducting path from one electrode to the other through both wires at their crossing.

2. In a device for welding, at their crossing, a strand and a stay wire of a preformed metal fabric, the combination of an electrode formed of separable parts, a spring pressing said parts together and permitting them to be spread apart by forcing one wire of the pair between them to extend said electrode through the fabric, a recess between said parts in which said wire is received to permit closure together of the parts extended through the fabric, a shoulder on said electrode to support the other wire of said pair at said crossing, and a complementary electrode adapted to be moved into contact with the first wire of the pair at said crossing to form a closed electrically conducting path from one electrode to the other through both wires at their crossing.

3. In a device for welding, at their crossing, a strand and a stay wire of a preformed metal fabric, the combination of an electrode formed of separable parts spring pressed together and adapted to be spread apart by forcing one wire of the pair between them to extend said electrode through the fabric, a recess between said parts in which said wire is received to permit closure of the parts together below said wire, a continuous shoulder on said electrode composed of aligned portions extending along both of said separable parts to support the other wire of said pair beneath and on both sides of said crossing, and a complementary electrode adapted to be moved into contact with the first wire of the pair at said crossing to form a closed electrically conducting path from one electrode to the other through both wires at their crossing.

4. In a device for welding, at their crossing, a strand and a stay wire of a preformed metal fabric, the combination of an electrode formed of separable parts having opposed faces adapted to abut each other, the said parts being spring pressed to contact each other at said faces and being adapted to be spread apart by forcing one wire of the pair between them, a recess between said parts adapted to receive said wire to permit closure of the parts together below said wire, a shoulder on said electrode having aligned portions extending along both of said parts in a direction substantially normal to the plane of said abutting faces to afford support for the other wire of said pair beneath and on both sides of said crossing, a pair of notches formed in said separable parts, one disposed beneath said contacting faces into which said first wire may be forced to wedge the faces apart in extending the electrode through the fabric, and the other disposed above said faces and communicating with said recess into which said first wire is forced to spread said faces apart in withdrawing the electrode from the fabric, and a complementary electrode adapted to be moved into contact with said first wire at said crossing to form a closed electrically conducting path from one electrode to the other through both wires at their crossing.

5. In a device for welding, at their crossing, a strand and a stay wire of a preformed metal fabric, the combination of an electrode formed of a plurality of jaw-like parts adapted to straddle one wire of the pair and to be extended through the fabric, a recess between said parts in which said wire is received to afford clearance from said wire, a shoulder on said electrode to support the other wire of said pair at said crossing and a complementary electrode adapted to be moved into contact with the first wire of the pair at said crossing to form a closed electrically conducting path from one electrode to the other through both wires at their crossing.

WILLIAM SAYLES SOUTHWICK.